United States Patent
Ellison

(10) Patent No.: US 9,026,571 B2
(45) Date of Patent: May 5, 2015

(54) RANDOM NUMBER GENERATION FAILURE DETECTION AND ENTROPY ESTIMATION

(75) Inventor: Carl M. Ellison, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1519 days.

(21) Appl. No.: 12/258,997

(22) Filed: Oct. 27, 2008

(65) Prior Publication Data

US 2010/0106756 A1  Apr. 29, 2010

(51) Int. Cl.
*G06F 7/58* (2006.01)

(52) U.S. Cl.
CPC .................................... *G06F 7/58* (2013.01)

(58) Field of Classification Search
None
See application file for complete search history.

(56) References Cited

U.S. PATENT DOCUMENTS

| | | | | |
|---|---|---|---|---|
| 5,377,270 | A * | 12/1994 | Koopman et al. | 380/262 |
| 6,557,120 | B1 * | 4/2003 | Nicholson et al. | 714/38.13 |
| 7,047,262 | B2 | 5/2006 | Hars | |
| 7,243,117 | B2 * | 7/2007 | Yamamoto et al. | 708/250 |
| 8,189,778 | B2 * | 5/2012 | Zhang | 380/44 |
| 2005/0201561 | A1 * | 9/2005 | Komano et al. | 380/255 |
| 2005/0204220 | A1 * | 9/2005 | Yasuda et al. | 714/724 |
| 2006/0067527 | A1 | 3/2006 | Urivskiy et al. | |
| 2007/0230694 | A1 * | 10/2007 | Rose et al. | 380/46 |
| 2008/0256151 | A1 | 10/2008 | Acar | |
| 2008/0270503 | A1 * | 10/2008 | Nilsson et al. | 708/255 |
| 2009/0077146 | A1 * | 3/2009 | Hars | 708/251 |
| 2010/0106757 | A1 * | 4/2010 | Matthews et al. | 708/251 |

OTHER PUBLICATIONS

Jun, et al., "The Intel Random Number Generator", retrieved at <<http://www.cryptography.com/resources/whitepapers/IntelRNG.pdf>>, Apr. 22, 1999, pp. 8.
John Viega, "Practical Random Number Generation in Software", Proceedings of the 19th Annual Computer Security Applications Conference, retrieved at <<http://www.cryptobarn.com/papers/acsac2k3.pdf>>, 2003, pp. 12.
Schouten, et al., "Maximum-Likelihood Estimation of the Entropy of an Attractor", retrieved at <<http://prola.aps.org/abstract/PRE/v49/i1/p126_1>>, pp. 2.
Gutterman, et al., "Analysis of the Linux Random Number Generator", retrieved at <<http://eprint.iacr.org/2006/086.pdf>>, Mar. 6, 2006, pp. 1-18.
Dorrendorf, et al., "Cryptanalysis of the Random Number Generator of the Windows Operating System", retrieved at <<http://eprint.iacr.org/2007/419.pdf>>, Nov. 4, 2007, pp. 1-24.
Steve Neuhauser, "Pseudo-Random Number Generators", retrieved at <<http://vorlon.case.edu/~sbn/prng.doc>>, pp. 6.

* cited by examiner

*Primary Examiner* — Lewis A Bullock, Jr.
*Assistant Examiner* — Christine Dang
(74) *Attorney, Agent, or Firm* — Kate Drakos; Micky Minhas

(57) ABSTRACT

In accordance with one or more aspects, an initial output string is generated by a random number generator. The initial output string is sent to a random number service, and an indication of failure is received from the random number service if the initial output string is the same as a previous initial output string received by the random number service. Operation of the device is ceased in response to the indication of failure. Additionally, entropy estimates for hash values of an entropy source can be generated by an entropy estimation service based on hash values of various entropy source values received by the entropy estimation service. The hash values can be incorporated into an entropy pool of the device, and the entropy estimate of the pool being updated based on the estimated entropy of the entropy source.

19 Claims, 6 Drawing Sheets

RANDOM NUMBER GENERATION FAILURE DETECTION AND ENTROPY ESTIMATION

BACKGROUND

Random numbers can be used in a variety of different computing scenarios. One common usage scenario is cryptography, where a cryptographic key and cryptographic processes rely on generation of random numbers. Unfortunately, it can be difficult to generate random numbers and to verify the randomness of the generated numbers. This can lead to various undesirable results, such as weakening the strength of cryptographic systems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, an initial output string is generated by a random number generator. The initial output string is sent to a random number service, and an indication of failure is received from the random number service if the initial output string is the same as a previous initial output string received by the random number service. Operation of the device is ceased in response to the indication of failure.

In accordance with one or more aspects, an initial output string generated by a random number generator of a device is received from the device. A determination as to whether the initial output string is the same as a previously received initial output string is made. If the initial output string is the same as the previously received initial output string, then an indication of failure is returned to the device. If the initial output string is not the same as the previously received initial output string, then a record of the initial output string is maintained and an indication of success is returned to the device.

In accordance with one or more aspects, a hash value is generated for a value of an entropy source of the device and is sent to an entropy estimation service. An entropy estimate for the value is received from the entropy estimation service, the entropy estimate for the value being based on both the hash value and hash values previously received by the entropy estimation service. The hash value is incorporated into an entropy pool of the device, and a new entropy estimate is generated for the entropy pool, the new entropy estimate being based on the entropy estimate for the value.

BRIEF DESCRIPTION OF THE DRAWINGS

The same numbers are used throughout the drawings to reference like features.

DETAILED DESCRIPTION

Random number generation failure detection and entropy estimation is discussed herein. A random number generator included in a device generates a series of random numbers that can be used by various components of the device. When the random number generator of a device is initialized, the device sends an initial string of numbers to a random number service. This random number service maintains a record of the initial strings of numbers it receives from various devices. If the random number service receives an initial string that it previously received, then the random number service indicates a failure of the random number generator initialization to the device. The device thus knows that the random number generator has failed, and the device can respond accordingly.

Additionally, the device can generate random numbers based on seed values obtained from an entropy pool. Different entropy sources can be combined to generate the entropy pool. For a particular entropy source, the device sends a value obtained from that entropy source to an entropy estimation service, which returns an estimated entropy value for that source. The estimated entropy values received for the various sources are combined to generate an entropy value representing the amount of entropy in the entropy pool.

Figure 1:
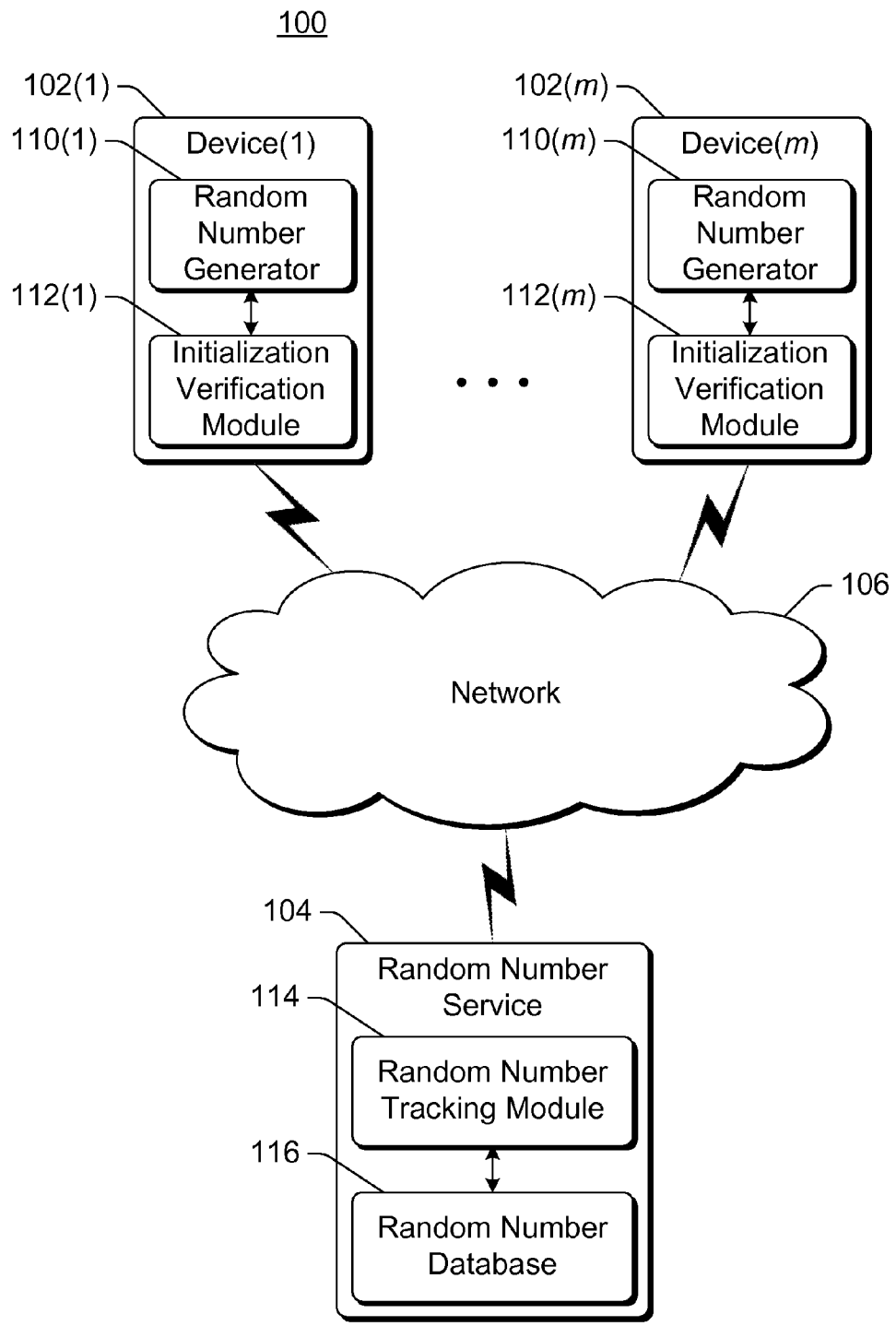
FIG. 1 illustrates an example system implementing the random number generation failure detection and entropy estimation in accordance with one or more embodiments.

FIG. 1 illustrates an example system 100 implementing the random number generation failure detection and entropy estimation in accordance with one or more embodiments. System 100 includes one or more (m) devices 102(1), . . . , 102(m) that can communicate with a random number service 104 via a network 106. Network 106 can be a variety of different networks, including the Internet, a local area network (LAN), a public telephone network, an intranet, other public and/or proprietary networks, combinations thereof, and so forth.

Each device 102 can be a variety of different devices. For example, device 102 can be a desktop computer, a mobile station, an entertainment appliance, a set-top box communicatively coupled to a display device, a cellular or other wireless phone, a game console, an automotive computer, and so forth. Thus, device 102 can range from a full resource device with substantial memory and processor resources (e.g., personal computers, game consoles) to a low-resource device with limited memory and/or processing resources (e.g., traditional set-top boxes, hand-held game consoles).

Random number service 104 can be implemented on one or more of a variety of different devices. Similar to the discussion of computing device 102, random number service 104 can be implemented by a variety of different devices, ranging from full resource devices with substantial memory and processor resources to low-resource devices with limited memory and/or processing resources. Additionally, in one or more embodiments random number service 104 is implemented distributed across one or more devices 102.

Each device 102 includes a random number generator 110 and an initialization verification module 112. Random number service 104 includes a random number tracking module 114 and a random number database 116. Generally, initialization verification module 112 obtains an initial output string from random number generator 110 and sends the initial output string to random number service 104. Random number tracking module 114 stores the initial output strings it receives from devices 102 in random number database 116. Random number tracking module 114 compares each received initial output string to previously received initial output strings stored in random number database 116. If random number tracking module 114 receives an initial output string from a device 102 that is the same string as was previously received (from the same device 102 or a different device 102), then tracking module 114 returns a failure indication to the device 102 from which it received the initial output string. Otherwise, tracking module 114 returns a success indication to the device 102 from which it received the initial output string.

Initialization verification module 112 receives either a success indication or a failure indication from tracking module 114 in response to the initial output string that was sent to service 104. A success indication indicates to module 112 that no failure of random number generator 110 was detected by service 104. The operation of device 102 is thus allowed to continue. However, a failure indication indicates to module 112 that service 104 detected a failure in the generation of the random number generator 110. Accordingly, initialization verification module 112 causes operation of device 102 to cease as discussed in more detail below.

Random number generator 110 is a deterministic system designed to imitate or approximate a true random generator. Accordingly, random number generator 110 can also be referred to as a pseudorandom number generator. Random number generator 110 can generate random numbers in one or more of a variety of different manners. In one or more embodiments, random number generator 110 generates random numbers based on a seed value obtained from an entropy pool. Examples of such entropy pools are discussed in more detail below. Random number generator 110 can apply a variety of different algorithms to the seed value to obtain random numbers, such as a one of the Secure Hash Algorithm (SHA) functions (e.g., SHA-512), a standard symmetric cryptographic algorithm (e.g., an Advanced Encryption Standard (AES)), and so forth.

Each time device 102 is reset, or alternatively each time random number generator 110 is reset, generator 110 outputs an initial output string. The size of this initial output string can vary and in one or more embodiments is 64 bytes, although alternatively larger or smaller initial output strings can be used. In one or more embodiments, the size of the initial output string is to be large enough that it does not result in an unacceptable number of false failures being detected by random number service 104, and also small enough so that the performance of device 102 is not hindered.

Initialization verification module 112 receives or otherwise obtains the initial output string generated by generator 110 and sends the initial output string to random number service 104. Random number tracking module 114 receives these initial output strings from the various devices 102 and maintains a record in database 116 of each different initial output string that is received by service 104. Random number database 116 can be a variety of different databases, records, data structures, and so forth capable of storing the initial output strings. Failure of random number generator 110 is inferred when random number tracking module 114 receives an initial output string that is the same as a previously received initial output string. This failure of generator 110 can be a failure of the algorithm or process used by generator 110 and/or a failure in the entropy of a seed value used by generator 110 to generate the initial output string. Regardless of the type of failure, receiving an initial output string that is the same as a previously received initial output string is interpreted as an indication that the randomness of numbers generated by generator 110 is not to be relied on.

When tracking module 114 determines that an initial output string is not the same as any previously received initial output string, tracking module 114 returns a success indication to the module 112 from which the initial output string was received. The success indication indicates to module 112 that random number service 104 detected no failure of random number generator 110. Accordingly, module 112 allows the operation of generator 110 and device 102 to continue uninterrupted. Whatever functions or operations that were to be performed by generator 110 and/or device 102 are allowed to continue.

However, when tracking module 114 determines that an initial output string is the same as a previously received initial output string, tracking module 114 returns a failure indication to the module 112 from which the initial output string was received. As the failure indication indicates to module 112 that module 114 detected a failure of generator 110, module 112 does not allow the operation of generator 110 and device 102 to continue. Rather, module 112 causes operation of device 102 to cease. In one or more embodiments, module 112 can also send a report of the failure to an administrator (optionally after such sending is approved by the user of device 102), notifying the administrator that a failure due to the initial output string having already been received by the random number service occurred. The report can include, for example, an identifier of the device from which the initial output string was received, a date and/or time that the initial output string was received and/or generated, information describing a current configuration of device 102, the initial output string itself, and so forth. Alternatively, such a report could be sent by, or maintained by, random number service 104.

Module 112 can cause the operation of device 102 to cease in a variety of different manners. In one or more embodiments, module 112 causes operation of device 102 to stop (e.g., device 102 crashes), forcing a user of device 102 to reset or restart device 102 in order to use device 102. Alternatively, module 112 can cause the operation of device 102 to cease in different manners, such as resetting device 102, resetting random number generator 110, and so forth. Regardless of the manner in which module 112 causes the operation of device 102 to cease, the result is random number generator 110 being re-initialized. This typically results in a new seed value being used by generator 110. Once re-initialized, a new initial output string is generated in the process discussed above is repeated.

In the example of FIG. 1, random number service 104 is illustrated as being a service separate from devices 102, receiving initial output strings from multiple devices 102. Alternatively, each device 102 could implement its own service 104 to identify duplicate initial output strings generated by the random number generator 110 of that device 102. These individual services 104 can operate independently of one another, or alternatively can communicate (at regular or irregular intervals) the contents of their random number databases to one another. Optionally, such communication can occur after the communication is approved by users of the devices 102.

Figure 2:
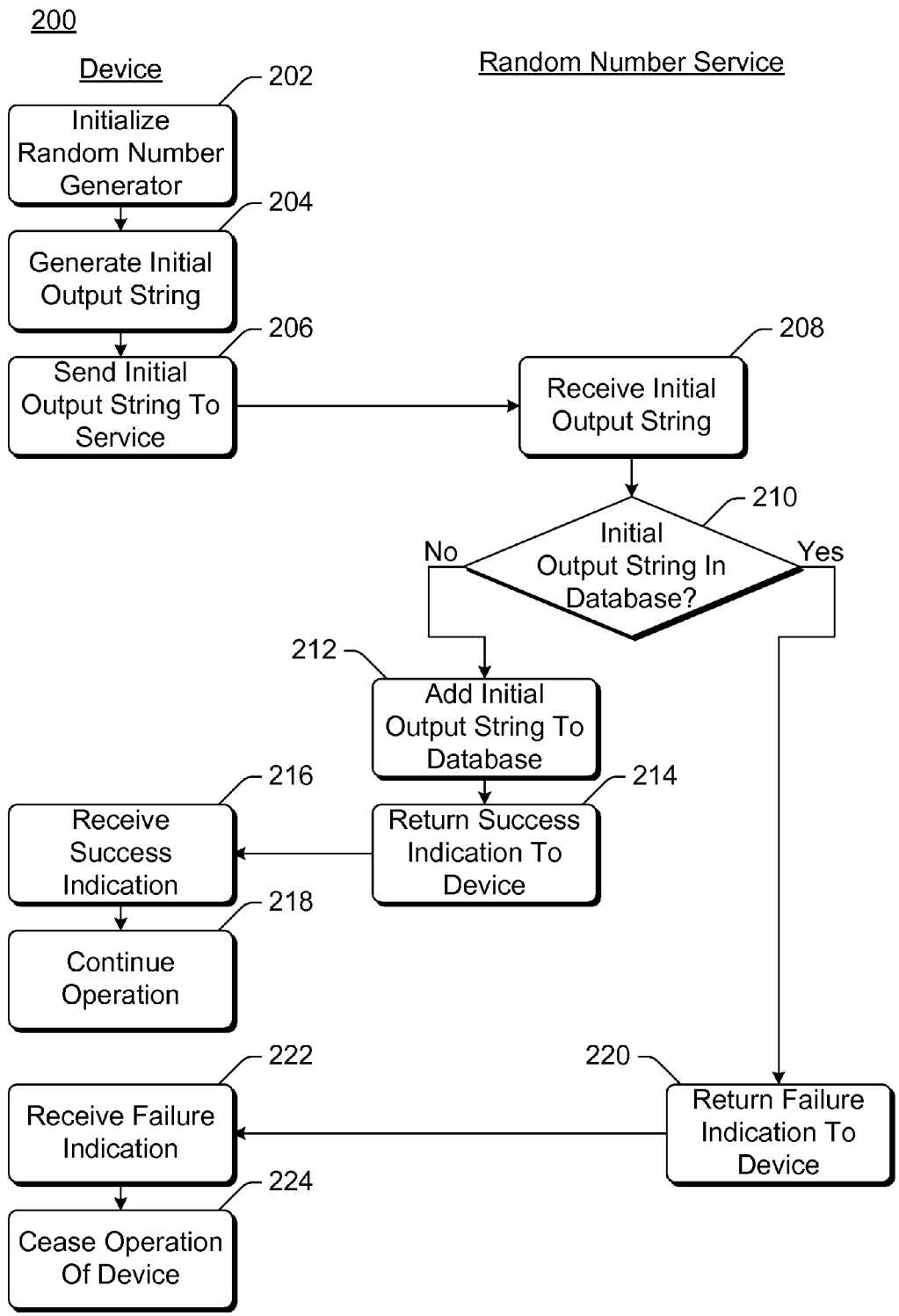
FIG. 2 is a flowchart illustrating an example process for performing the random number generation failure detection and entropy estimation in accordance with one or more embodiments.

FIG. 2 is a flowchart illustrating an example process 200 for performing the random number generation failure detection and entropy estimation in accordance with one or more embodiments. Process 200 can be implemented in software, firmware, hardware, or combinations thereof. Acts of process 200 illustrated on the left-hand side of FIG. 2 are carried out by a device, such as a device 102 of FIG. 1. Acts of process 200 illustrated on the right-hand side of FIG. 2 are carried out by a random number service, such as service 104 of FIG. 1. Process 200 is an example process for random number generation failure detection and entropy estimation; additional discussions of random number generation failure detection and entropy estimation are included herein with reference to different figures.

In process 200, the random number generator in a device is initialized (act 202). This initialization occurs each time a random number generator is reset, including each time the device is reset. Additionally, this initialization can occur at other times as desired by the designer of (or an administrator of) the random number generator, the device, and/or one or more other modules or components of the device. The manner in which this initialization occurs can vary based on the manner in which the random number generator is implemented. In one or more embodiments, this initialization includes obtaining a seed value from an entropy store as discussed in more detail below.

The random number generator generates an initial output string (act 204) which is sent to the random number service (act 206). The random number service receives the initial output string (act 208) and determines whether the received initial output string is in a database of the random number service (act 210). As discussed above, the random number service maintains a database that records the initial output strings received from various devices. The strings in this database are used for the comparison in act 210.

If the initial output string is not in the database then the initial output string received in act 208 is added to the database (act 212). Additionally, a success indication is returned to the device (act 214). The device receives the success indication (act 216) and continues operation (act 218) without interruption.

Returning to act 210, if the initial output string received in act 208 is in the database, then a failure indication is returned to the device (act 220). The device receives the failure indication (acts 222) and ceases operation of the device (act 224). As discussed above, the operation of the device can be ceased in a variety of different manners.

Figure 3:
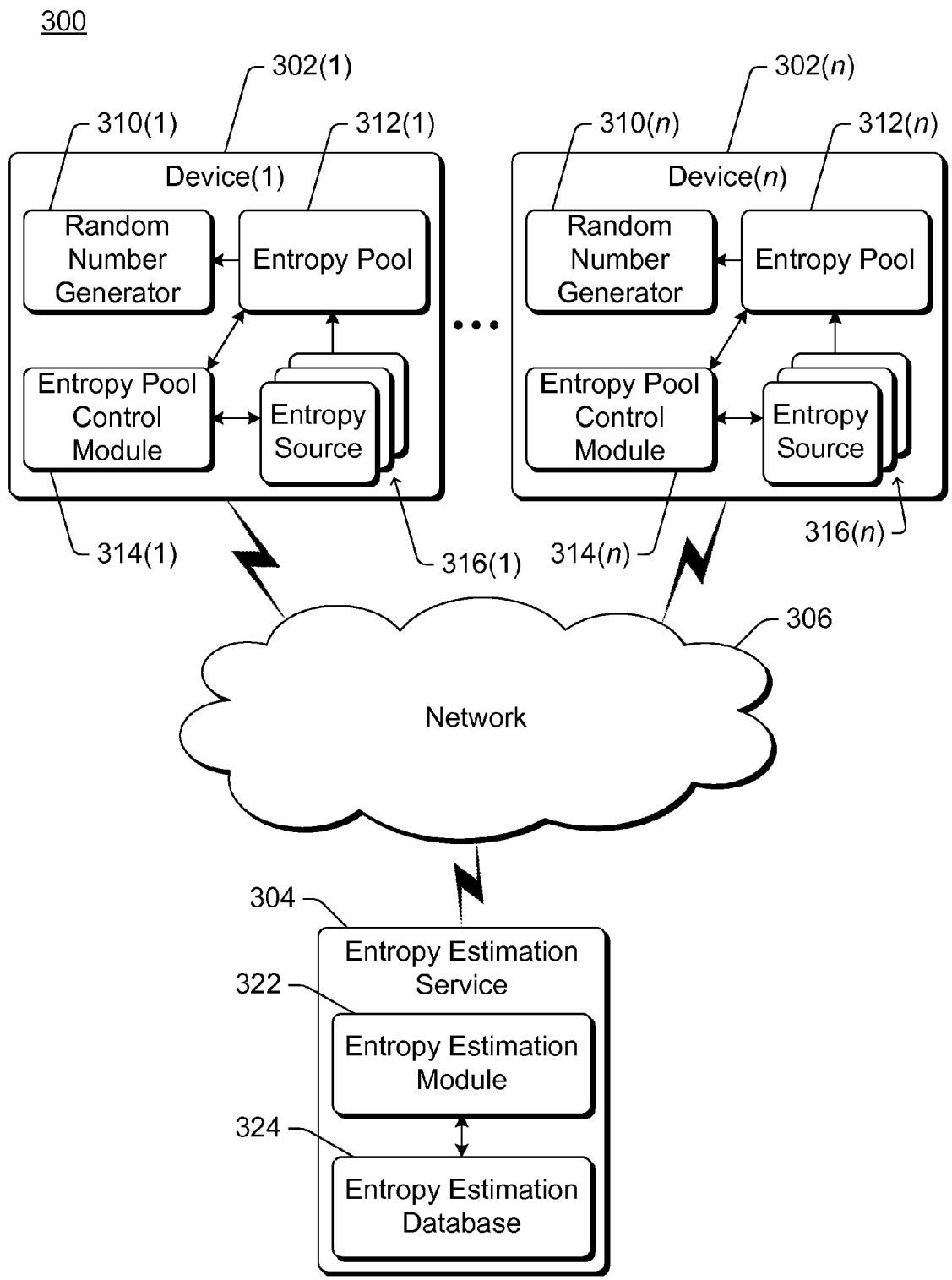
FIG. 3 illustrates another example system implementing the random number generation failure detection and entropy estimation in accordance with one or more embodiments.

FIG. 3 illustrates another example system 300 implementing the random number generation failure detection and entropy estimation in accordance with one or more embodiments. System 300 illustrates one or more embodiments supporting random number generation based on a seed value from an entropy pool. The random number generation discussed with reference to FIG. 3 can be used with system 100 of FIG. 1, or alternatively can be used independently of system 100.

System 300 includes one or more (n) devices 302(1), ..., 302(n) that can communicate with an entropy estimation service 304 via a network 306. Network 306 can be a variety of different networks, analogous to network 106 of FIG. 1. Each device 302 can be a variety of different devices analogous to devices 102 of FIG. 1. Similarly, entropy estimation service 304 can be implemented on one or more devices analogous to random number service 104 of FIG. 1.

Each device 302 includes a random number generator 310, an entropy pool 312, an entropy pool control module 314, and one or more entropy sources 316. In one or more embodiments, each device 302 is a device 102 of FIG. 1. Entropy estimation service 304 includes an entropy estimation module 322 and entropy estimation database 324. In one or more embodiments, entropy estimation service 304 is implemented by a same device or devices implementing random number service 104 of FIG. 1. Generally, a random number generator 310 obtains a seed value from an entropy pool 312 and generates a random number based on the seed value. The entropy pool is generated based on multiple entropy sources 316 and is managed by module 314. Entropy pool 312 has an associated estimated entropy (also referred to as an entropy value) that is based on the entropies (or entropy values) of each of the sources 316. The entropy of each source 316 is determined by entropy estimation service 304 based at least in part on the values of the entropy sources 316.

Random number generator 310 generates random numbers based on a seed value obtained from entropy pool 312. In one or more embodiments, entropy pool 312 is a 512-bit value that is provided to generator 310 as the seed value, although alternatively larger or smaller seed values can be used. The value stored as entropy pool 312 is generated based on the values from multiple entropy sources 316, as discussed in more detail below. Random number generator 310 can optionally have a threshold entropy estimate that is to be maintained by entropy pool 312. If the entropy estimate for pool 312 does not satisfy this threshold, then random number generator 310 does not use pool 312 for a seed value until this threshold is satisfied.

Entropy pool 312 can optionally be saved when device 302 is powered-down, allowing entropy pool 312 to be restored each time device 302 is reset. Additionally, the value of entropy pool 312 can be recalculated at regular or irregular intervals. For example, the value can be recalculated each time new data from an entropy source 316 is available, can be recalculated every 5 minutes, every 30 seconds, or every 2 hours, can be recalculated when requested by another component or module (e.g., generator 310), and so forth.

Each entropy source 316 is a source of data or values having some amount of randomness. A variety of different sources can be used as entropy sources 316. For example, system information such as various system clocks or timers, how many page faults have occurred, how much free RAM is available, occupied disk drive space, free disk drive space, system lookaside information, system interrupt information, and so forth can each be an entropy source 316. Network information such as numbers of packets received or sent, network packet timings, addresses from which network packets are received, and so forth can each be an entropy source 316. The timing or content of mouse movements, keystrokes, voice inputs, and other similar events can each be an entropy source 316.

Existing hardware sources on a computing system can also serve as entropy sources 316. Events generated by a keyboard, mouse, network card, and so forth, can be entropy sources 316. The data from a sound or video input with (or without) a source plugged into it can be entropy sources 316. Disk drives may have small random fluctuations in their rotational speed due to chaotic air turbulence that can be measured by low level disk seek time instrumentation and used as an entropy source 316.

A hardware random number generator included in, or coupled to, device 302 can also be an entropy source 316. A hardware random number generator refers to a special-purpose hardware component that produces a random output. For example, such a hardware random number generator can be based on amplified noise generated by an electronic circuit, environmental acoustic noise, quantum effects in a semiconductor, timing of radioactive decays, and so forth.

The data from each entropy source 316 is hashed to generate a hash value that is incorporated into entropy pool 312.

Entropy source 316 can include a component to generate the hash value, entropy pool control module 314 can generate the hash value, or alternatively another component or module can generate the hash value. The hash value can be generated using a variety of different hashing functions, typically using a cryptographic hash function. For example, one of the Secure Hash Algorithm (SHA) functions such as SHA-512-HMAC can be used. In one or more embodiments the hash value is a 512-bit value, although larger or smaller hash values can alternatively be used. The hash functions can be key-based, with the device 302 optionally using that key for only the hash values generated by module 314 (and/or entropy sources 316).

Each entropy source 316 has a corresponding entropy estimate (also referred to as an entropy estimate value) that is an estimate of the amount of randomness in the source. The entropy sources 316 are combined together by entropy pool control module 314 to generate entropy pool 312. Similarly, entropy estimates of the various entropy sources 316 are combined together by entropy pool control module 314 to generate an entropy estimate for entropy pool 312. The entropy estimate for entropy pool 312 (also referred to as an entropy estimate value for pool 312) is an estimate of the amount of randomness in entropy pool 312.

The multiple entropy sources 316 can be combined to generate entropy pool 312 in a variety of different manners. In one or more embodiments, the entropy sources 316 are combined by hashing together the hash values of the data of the entropy sources 316. This combined hashed value is the value of entropy pool 312. Any of a variety of different hash functions can be used to perform this hashing as discussed above. Alternatively, the entropy sources 316 can be combined in other manners, such as performing an exclusive-or operation on the hash values of the data of the entropy sources 316. When new data is available from an entropy source 316, this new data can be incorporated into entropy pool 312 by combining (e.g., hashing, using an exclusive-or operation, and so forth) the new data with the previous entropy pool 312.

The entropy estimate for entropy pool 312 is determined by combining the entropy estimates of the entropy sources 316. In one or more embodiments, the entropy estimates of the entropy sources 316 are combined together by adding the entropy estimates together. Alternatively, the entropy estimates can be combined together in different manners. When new data from an entropy source is added to entropy pool 312, the entropy estimate of the new data can be added to the entropy estimate of the entropy pool 312.

The entropy estimates for source 316 can change over time. Accordingly, when data from an entropy source 316 is incorporated into entropy pool 312 by combining the data with entropy pool 312, control module 314 can maintain a record of the entropy estimate of that entropy source 316.

Each time new data from an entropy source 316 is added to entropy pool 312, the entropy estimate for the new data from that entropy source 316 is obtained from entropy estimation service 304. Entropy pool control module 314 generates (if not already generated) a hash value of the data of an entropy source 316. For example, this could be a hash value of a pointer location, a hash value of an amount of pointer movement, a hash value of how many page faults have occurred, and so forth. This hash value can be the hash value that is incorporated into entropy pool 312 as discussed above, or alternatively a different hash value generated using a variety of different hashing functions. The size of this hash value can vary, and in one or more embodiments is 1 byte or 2 bytes, although alternatively larger or smaller sizes can be used. In one or more embodiments, the size of this hash value is to be large enough to provide a large enough number of values for the entropy source 316, and small enough so as to not overestimate the entropy estimate for the entropy source 316.

In obtaining the entropy estimate of an entropy source 316, the hash value of the data of the entropy source 316 itself can be generated, or alternatively a hash value of a function of the data of the entropy source 316 (e.g., a hash value of the first or higher order difference of the data of the entropy source 316). For example, assume an entropy source 316 is the count of page faults since the system 300 booted. The count of page faults is typically different each time data is obtained from this entropy source 316, but the difference between these counts each time data is obtained from this entropy source 316 may be the same (e.g., a difference of 1). Accordingly, the first difference would show a constant value, while the raw entropy source values would be different. In one or more embodiments, the one of the these two values having the lesser entropy (which is the first difference of the entropy source values in this example) is used in generating the entropy estimate of the entropy source 316.

Control module 314 sends this hash value to entropy estimation service 304. A different entropy estimation service 304 can be used for each entropy source 316, or alternatively the same entropy estimation service 304 can be used for two or more entropy sources 316.

Entropy estimation module 322 maintains an entropy estimation database 324 for each entropy source 316 managed by service 304. Entropy estimation database 324 can be a variety of different databases, records, data structures, and so forth capable of storing hash values. Each hash value received by service 304 is added to the database 324 for that entropy source. A count of how many times a hash value has been received by service 304 is also maintained for each hash value in database 324. This count is also referred to as an occurrence count for the hash value. Accordingly, when service 304 receives a hash value from control module 314 entropy estimation module 322 checks whether the hash value is already stored in database 324. If the hash value is already stored in database 324, then the count of occurrences of that hash value is incremented by one. However, if the hash value is not already stored in database 324, then the hash value is stored in database 324 with an occurrence count set at one.

Entropy estimation module 322 also generates an entropy estimate for the received hash value. The entropy estimate is based on both the hash value received and the hash values previously received by service 304 (whether from the same device 302 or different devices 302). The entropy estimate can be generated in a variety of different manners. In one or more embodiments, an entropy estimate value H is generated using the following calculation:

$$H = -\log_2\left(\frac{M}{N}\right)$$

where the value M refers to the maximum occurrence count over database 324 (the largest occurrence count of any received hash values in database 324), and the value N refers to the total number of hash values in database 324.

Entropy estimation module 322 returns the entropy estimate for the received hash value (which is also the entropy estimate for the value of the entropy source 316) to entropy pool control module 314. Control module 314 in turn uses the entropy estimate for the hash value to update the entropy estimate of entropy pool 312 as discussed above.

In one or more embodiments, steps are taken to verify that service 304 is trustworthy, and thus that any entropy estimates received from service 304 are reliable. The steps taken to perform this verification can vary. In one or more embodiments, network 306 is a secure network (e.g., a corporate or personal network), and the trustworthiness of service 304 is inherent in service 304 being coupled to network 306. Alternatively, various cryptographic techniques can be used to open a secure channel between a device 302 and service 304, and authenticate service 304 (e.g., using a public certificate, password, and so forth).

It should be noted that, although entropy estimation service 304 is illustrated as a service separate from devices 302, alternatively a service 304 can be implemented in each device 302. Each device 302 could implement its own service 304 to generate entropy estimation values for entropy sources of that device 302.

Figure 4:
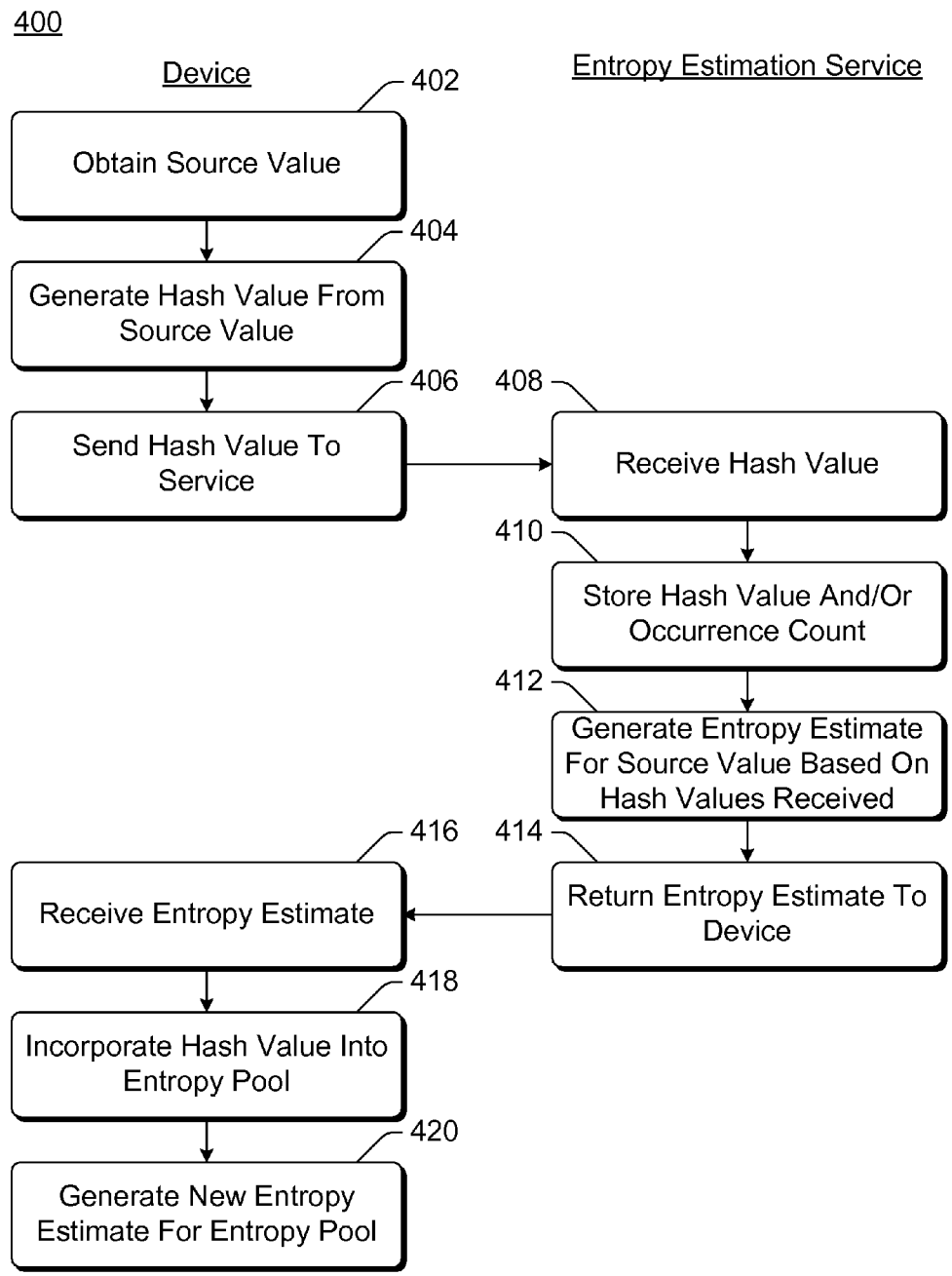
FIG. 4 is a flowchart illustrating an example process for performing the random number generation failure detection and entropy estimation in accordance with one or more embodiments.

FIG. 4 is a flowchart illustrating an example process 400 for performing the random number generation failure detection and entropy estimation in accordance with one or more embodiments. Process 400 can be implemented in software, firmware, hardware, or combinations thereof. Acts of process 400 illustrated on the left-hand side of FIG. 4 are carried out by a device, such as a device 302 of FIG. 3. Acts of process 400 illustrated on the right-hand side of FIG. 4 are carried out by an entropy estimation service, such as service 304 of FIG. 3. Process 400 is an example process for random number generation failure detection and entropy estimation; additional discussions of random number generation failure detection and entropy estimation are included herein with reference to different figures.

In process 400, a source value is obtained (act 402). The source value is a data value of an entropy source, such as an entropy source 316 of FIG. 3. A hash value is generated from this source value (act 404). This hash value can be generated using a variety of different hash functions as discussed above.

The hash value is sent to an entropy estimation service (act 406), which receives the hash value (act 408). The particular entropy estimation service to which the hash value is sent can vary based on the entropy source as discussed above.

The entropy estimation service stores the hash value and/or occurrence count for the hash value (act 410). The hash value is stored in a database or other record as discussed above. In one or more embodiments, the entropy estimation service stores the hash value if that particular hash value has not been previously received by the entropy estimation service. Alternatively, the entropy estimation service may be preconfigured to store all possible hash values for the entropy source, in which case the storage of a hash value in act 410 need not be performed. Regardless of whether the hash value is stored or has already been stored, the occurrence count for that hash value is stored in act 410. This can be an initial value for the occurrence count (e.g., a value of 1) if this is the first time the hash value has been received, or an incremented value for the occurrence count (e.g., incremented by a value of 1) if this is the second or subsequent time the hash value has been received.

An entropy estimate for the source value is generated based on the hash values received by the entropy estimation service (act 412). As discussed above, this generation is based on both the received hash value, as well as previously received hash values.

The generated entropy estimate is returned to the device from which the hash value was received (act 414). The device receives the entropy estimate (act 416), and incorporates the hash value into the entropy pool for the device (act 418). The hash value is incorporated into the entropy pool by combining the hash value with the entropy pool as discussed above. A new entropy estimate for the entropy pool is also generated (act 420). This new entropy estimate for the entropy pool is based on both the entropy estimate received in act 416 and the previous entropy estimate for the entropy pool as discussed above.

Returning to FIG. 3, entropy pool control module 314 sends hash values from entropy sources 316 to entropy estimation service 304 as discussed above. In one or more embodiments, these hash values are sent on an individual basis by control module 314. Alternatively, multiple hash values can be collected and maintained locally by controlled module 314, and then sent as a set of hash values to service 304.

Figure 5:
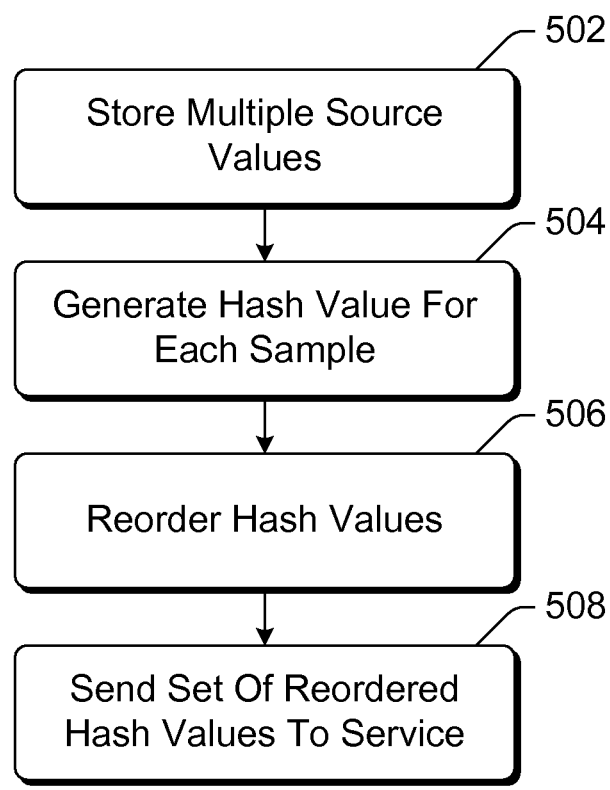
FIG. 5 is a flowchart illustrating an example process for generating and sending a set of hash values in accordance with one or more embodiments.

FIG. 5 is a flowchart illustrating an example process 500 for generating and sending a set of hash values in accordance with one or more embodiments. Process 500 is carried out by a device, such as device 302 of FIG. 3, and can be implemented in software, firmware, hardware, or combinations thereof. In one or more embodiments, process 500 implements acts 404 and 406 of FIG. 4.

In process 500, multiple source values are stored (act 502). The source values are from a particular entropy source 316 of FIG. 3. Source values from multiple entropy sources 316 can be stored but are grouped together by entropy source.

A hash value for each sample is generated (act 504). This hash value can be generated as each sample is received and stored, or alternatively hash values for multiple samples can be generated after a threshold number of samples are stored.

The generated hash values are also reordered (act 506), and the set of reordered hash values is sent to the entropy estimation service (act 508). The reordering of the hash values in act 506 removes from the set of hash values information regarding the order in which the multiple source values occurred. The hash values can be reordered in act 506 in a variety of different matters, such as by placing the hash values in ascending numerical order, by placing the hash values in descending numerical order, by placing the hash values in a random ordering, by placing the hash values in accordance with some other rules or criteria, and so forth. In situations where the stored source values result in a duplication of hash values being generated, an occurrence count of the hash values can also be generated and sent to the entropy estimation service.

In process 500, the entropy estimation service receives multiple hash values as a set rather than individual hash values. The entropy estimation service can operate on these multiple hash values individually as if they had been received individually. The entropy estimation service can return an entropy estimate to the device after it has processed each individual hash value, or alternatively after it has processed multiple hash values (e.g., the set of received hash values).

The quantity of hash values collected in a set before being sent to the entropy estimation service can vary, and in one or more embodiments is determined based on an expected difficulty in an attacker reconstructing the order in which the source values (from which the hash values were generated) occurred. The expected difficulty for an attacker to reconstruct the order in which the source values occurred can be estimated in a variety of different manners. When the estimated value is at least a threshold value, then the collected set of hash values can be sent to the entropy estimation service. Accordingly, different sets that are sent to the entropy estimation service can include different quantities of hash values.

In one or more embodiments, the expected difficulty is estimated using a number of permutations methodology as follows. If there are N sample values, k of which are different, with the first value occurring $n_1$ times, the second value occurring $n_2$ times, and so forth, and $N=\Sigma_{i=1}^{k} n_i$, then the number of possible permutations P of these sample values can be represented as:

$$P = \frac{N!}{n_1! n_2! \ldots n_k!}$$

When the value P is at least a threshold value, then the attacker's expected difficulty is too great and the set of values can be sent to the entropy estimation service. Examples of such a threshold value are 512 bits or 128 bits, although smaller or larger values can alternatively be used.

In other embodiments, a Markov transition matrix methodology can be used to estimate the expected difficulty in reconstructing the order in which the source values occurred as follows. Assume that there are N sample values that are integers 1 ... k, and a sample $s_j$ would have a value from that set of integers. The histogram of sample sequences can be collected, $(s_{j-1}, s_j)$ for all j from 2 to N for a 2nd order transition probability. An entropy of the transitions $H_{order}$ can be calculated, and will be less than $\log_2 k$. The number of possible permutations P from above can be adjusted by this entropy, and the following determined:

$$W = \log_2 P$$
$$W' = \frac{W H_{order}}{\log_2 k}$$

The value W' can be used as the estimate of the expected difficulty in reconstructing the order in which the source values occurred. The value W' is in units of bits, and in one or more embodiments is to be at least a threshold value reflecting that the attacker's expected difficulty is too great (and the set of values can then be sent to the entropy estimation service). An example of such a high enough value W' would be 512 bits, although smaller or larger values can alternatively be used.

Figure 6:
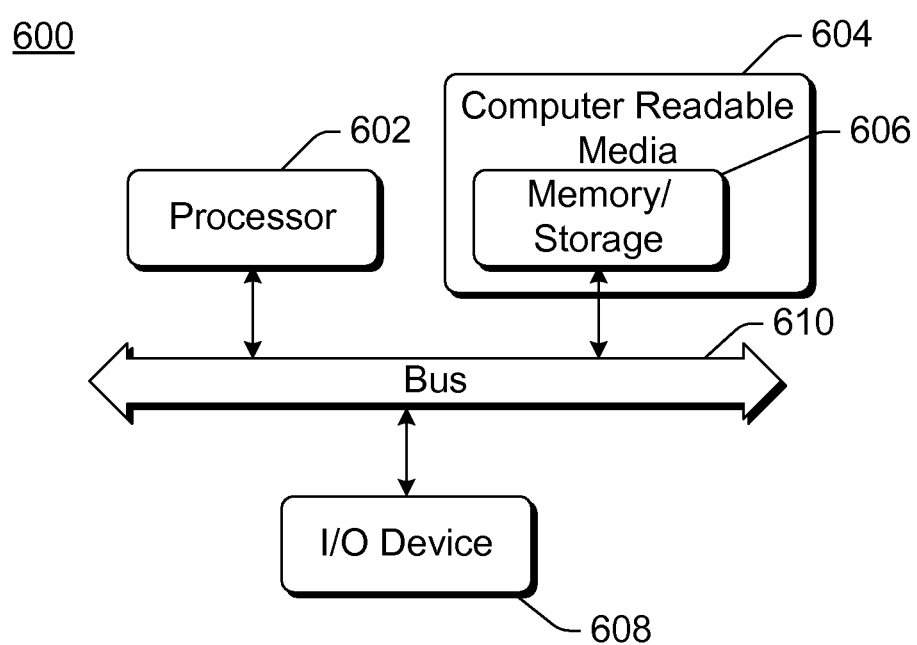
FIG. 6 illustrates an example computing device that can be configured to implement the random number generation failure detection and entropy estimation in accordance with one or more embodiments.

FIG. 6 illustrates an example computing device 600 that can be configured to implement the random number generation failure detection and entropy estimation in accordance with one or more embodiments. Computing device 600 can be, for example, a computing device 102 of FIG. 1, a computing device 302 of FIG. 1, and so forth. Computing device 600 can also implement, for example, a service 104 of FIG. 1, a service 304 of FIG. 3, and so forth.

Computing device 600 includes one or more processors or processing units 602, one or more computer readable media 604 which can include one or more memory and/or storage components 606, one or more input/output (I/O) devices 608, and a bus 610 that allows the various components and devices to communicate with one another. Computer readable media 604 and/or one or more I/O devices 608 can be included as part of, or alternatively may be coupled to, computing device 600. Bus 610 represents one or more of several types of bus structures, including a memory bus or memory controller, a peripheral bus, an accelerated graphics port, a processor or local bus, and so forth using a variety of different bus architectures. Bus 610 can include wired and/or wireless buses.

Memory/storage component 606 represents one or more computer storage media. Component 606 can include volatile media (such as random access memory (RAM)) and/or nonvolatile media (such as read only memory (ROM), Flash memory, optical disks, magnetic disks, and so forth). Component 606 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 602. It is to be appreciated that different instructions can be stored in different components of computing device 600, such as in a processing unit 602, in various cache memories of a processing unit 602, in other cache memories of device 600 (not shown), on other computer readable media, and so forth. Additionally, it is to be appreciated that the location where instructions are stored in computing device 600 can change over time.

One or more input/output devices 608 allow a user to enter commands and information to computing device 600, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable media, further description of which can be found with reference to FIG. 6. The features of the random number generation failure detection and entropy estimation techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a device, the method comprising:
   generating a hash value for a value of an entropy source of the device;
   sending the hash value to an entropy estimation service;
   receiving, from the entropy estimation service, an entropy estimate for the value that is based on both the hash value and hash values previously received by the entropy estimation service;
   incorporating the hash value into an entropy pool to be used by the random number generator;
   generating a new entropy estimate for the entropy pool based on the entropy estimate for the value;
   if the new entropy estimate for the entropy pool satisfies a threshold entropy estimate that is maintained by the entropy pool, then:
      generating an initial output string with a size of larger than a byte by a random number generator;
      sending the initial output string to a random number service;
      receiving, from the random number service, an indication of failure of the random number generator if the initial output string is the same as a previous initial output string received by the random number service; and
      re-initializing the random number generator in response to the indication of failure.

2. A method as recited in claim 1, wherein re-initializing the random number generator comprises resetting the random number generator.

3. A method as recited in claim 1, wherein re-initializing the random number generator comprises causing the random number generator to crash.

4. A method as recited in claim 1, wherein the previous initial output string was received by the random number service from another device.

5. A method as recited in claim 1, further comprising receiving, from the random number service, an indication of success that indicates no failure of the random number generator if the initial output string is different from previous initial output strings received by the random number service.

6. A method as recited in claim 1, the random number service being implemented by the device.

7. A method as recited in claim 1, further comprising sending, to an administrator, a report of the initial output string having been determined to be the same as the previous initial output string.

8. One or more computer storage memories having stored thereon multiple instructions that, when executed by one or more processors, cause the one or more processors to:
   generate a hash value for a value of an entropy source of a device;
   send the hash value to an entropy estimation service;
   receive, from the entropy estimation service, an entropy estimate for the value that is based on both the hash value and hash values previously received by the entropy estimation service;
   incorporate the hash value into an entropy pool to be used by a random number generator;
   generate a new entropy estimate for the entropy pool based on the entropy estimate for the value;
   if the new entropy estimate for the entropy pool satisfies a threshold entropy estimate that is maintained by the entropy pool, then:
      receive, from the device, an initial output string generated by the random number generator of the device based at least in part on the entropy pool;
      determine whether the initial output string is the same as a previously received initial output string;
      if the initial output string is the same as the previously received initial output string, then return an indication of failure to the device, the indication of failure causing the random number generator to re-initialize; and
      if the initial output string is not the same as the previously received initial output string, then maintain a record of the initial output string and return an indication of success to the device.

9. One or more computer storage memories as recited in claim 8, the multiple instructions further causing the one or more processors to send, to an administrator, a report of the initial output string having been determined to be the same as the previously received output string.

10. One or more computer storage memories as recited in claim 8, the previously received initial output string having been received from a different device.

11. One or more computer storage memories as recited in claim 8, the indication of failure causing the random number generator to re-initialize.

12. One or more computer storage memories as recited in claim 8, the one or more processors being included in one or more devices other than the device.

13. A system comprising:
   an entropy source of the device configured to generate a hash value for a value of the entropy source;
   an entropy control module configured to:
   send the hash value to an entropy estimation service;
   receive, from the entropy estimation service, an entropy estimate for the value that is based on both the hash value and hash values previously received by the entropy estimation service; and
   incorporate the hash value into an entropy pool;
   wherein a random number generator utilizes the entropy pool to generate a new entropy estimate for the entropy pool based on the entropy estimate for the value and a previously received entropy estimate for the entropy pool; and
   if the new entropy estimate for the entropy pool satisfies a threshold entropy estimate that is maintained by the entropy pool, then:
   the random number generator configured to create an initial output string with a size of 64 bytes;
   a random number service configured to receive and store the initial output string from the random number generator;
   the random number service is further configured to send an indication of failure to the random number generator if the initial output string is the same as a previous initial output string received by the random number service;

the random number generator is further configured to re-initialize upon receipt of the indication of failure.

14. The system of claim 13, wherein the random number generator is configured to re-initialize by resetting the random number generator.

15. The system of claim 13, wherein the random number generator is configured to re-initialize by being caused to crash.

16. The system of claim 13, wherein the random number service is configured to receive the previous initial output string from a different random number generator.

17. The system of claim 13, wherein the random number generator and the random number service are implemented on a same device.

18. The system of claim 13, wherein the random number generator and the random number service are distributed across a plurality of devices.

19. A method as recited in claim 1, wherein the size of the initial output string is 64 bytes.

\* \* \* \* \*